United States Patent
Furbeck

(10) Patent No.: US 8,050,932 B2
(45) Date of Patent: Nov. 1, 2011

(54) APPARATUS, AND ASSOCIATED METHOD, FOR SELECTING SPEECH CODER OPERATIONAL RATES

(75) Inventor: David Furbeck, Keller, TX (US)

(73) Assignee: Research In Motion Limited, Waterloo (CA)

( * ) Notice: Subject to any disclaimer, the term of this patent is extended or adjusted under 35 U.S.C. 154(b) by 925 days.

(21) Appl. No.: 12/034,547

(22) Filed: Feb. 20, 2008

(65) Prior Publication Data
US 2009/0209300 A1    Aug. 20, 2009

(51) Int. Cl.
*G10L 21/00* (2006.01)
(52) U.S. Cl. .... 704/500; 704/219; 704/221; 375/240.23
(58) Field of Classification Search ............... 704/219, 704/221, 500; 375/240.23
See application file for complete search history.

(56) References Cited

U.S. PATENT DOCUMENTS

| | | | | |
|---|---|---|---|---|
| 5,115,469 A | * | 5/1992 | Taniguchi et al. | 704/228 |
| 5,737,030 A | * | 4/1998 | Hong et al. | 725/41 |
| 2004/0064309 A1 | * | 4/2004 | Kosai | 704/211 |
| 2010/0010812 A1 | * | 1/2010 | Makinen | 704/221 |

FOREIGN PATENT DOCUMENTS

| | | |
|---|---|---|
| EP | 1143685 A1 | 10/2001 |
| WO | 95/12257 A1 | 5/1995 |
| WO | 2004/105417 A1 | 12/2004 |

* cited by examiner

*Primary Examiner* — Daniel D Abebe

(57) ABSTRACT

An apparatus and an associated method for facilitating selection of CODEC availability from amongst a set of CODECs at a communication device. A battery power measurer measures the stored energy level of a battery power supply that powers a communication device of which the CODEC forms a portion. A selector selects the available CODECs responsive to the measured power level. If the measured level is less than a threshold, then high-sampling-rate CODECs are at least selectably made unavailable for use. If the battery level is higher than the threshold, then the high-sampling-rate CODECs are made available for use. If the level is greater than a threshold then both a high sampling-rate and the low sampling-rate CODEC are available. An indication generator generates an indication of selection made by the selector.

23 Claims, 3 Drawing Sheets

APPARATUS, AND ASSOCIATED METHOD, FOR SELECTING SPEECH CODER OPERATIONAL RATES

The present disclosure relates generally to a manner by which to operate a communication device, such as a mobile station powered by a battery power supply that includes a set of CODECs (COder-DECoders). More particularly, the present disclosure relates to apparatus, and an associated methodology, by which to select which CODEC or CODECs of the set to make available for use pursuant to performance of a communication service. Selection is dependent upon the level of stored energy available at a battery power supply that powers the communication device.

If the battery power supply is depleted beyond a selected level, the availability of an optional CODEC which operates at a high sampling rate, i.e., higher power-consumptive, mode is at least selectably removed, thereby to permit reduction in the rate of battery depletion during operation of the communication device.

BACKGROUND OF THE INVENTION

Recent years have witnessed the introduction and commercial deployment of a wide variety of communication systems and communication devices operable therein. Many varied communication services are able to be performed by way of communication systems. And, as additional advancements in communication technology shall likely continue to be made, yet more communication systems, providing yet more communication services, shall likely become available.

A cellular communication system is exemplary of a communication system that utilizes advancements in communication technologies and that, in significant part, has been made possible as a result of such advancements. Successive generations of cellular communication systems, and systems that exhibit some of the characteristics of cellular communication systems, have been developed and deployed. Newer-generation systems generally utilize digital communication techniques, oftentimes employing data coding functions. When speech data is communicated, i.e., a voice call forms the communication service, speech coding, and subsequent decoding, is oftentimes performed. The speech coding, and corresponding decoding, is performed using a CODEC (COder-DECoder) that operates to encode a stream of voice data into coded form. The coding of the voice data typically compresses the data, removing redundancies therefrom. And, decoding operations of the CODEC operate in reverse manner, that is to convert a compressed stream of data and to decompress the compressed stream.

An operational characteristic of a speech CODEC is its sampling rate. A CODEC that operates at a higher sampling rate generally provides better performance than a CODEC that operates at a low sampling rate. That is to say, if a CODEC operates at a high sampling rate, the voice quality of communicated voice data, once received and decoded is generally superior than when a CODEC operates at a lower sampling rate.

Various communication standards define the operational requirements of CODECs. For example, a 3GPP ($3^{rd}$ Generation Partnership Project) operating specification pertaining to speech CODECs defines standard parameters for an AMR (Adapted Multi-Rate) CODEC and an AMR-WB (Adapted Multi-Rate Wide Band) speech CODEC. An AMR speech CODEC is operated at an 8 kHz sampling rate, and an AMR-WB speech CODEC is operated at a 16 kHz sampling rate. In other communication systems, defined by other operating standards, analogous CODEC operating parameters are analogously defined.

While a CODEC operated at a higher sampling rate generally provides improved voice quality, such higher-rate CODECs require increased computational complexities, viz., higher CPU loads. For instance, when the CPU load is quantified in terms of WMOPS (Weighted Million Operations Per Second), the higher-rate, AMR-WB CODEC requires 38.9 WMOPS as contrasted to 16.8 WMOPS for the lower-rate AMR. The CPU load for the higher-rate CODEC operation is 130% greater than the CPU load of the lower-rate operation, largely due to the doubling of the sampling rate.

Additionally, if the higher rate is used in all processing algorithms of a communication station, including, e.g., acoustic echo cancellation, dynamic range controller, noise suppression, and post filtering, the CPU loading associated with running of these additional audio processing algorithms would result in an analogous increase in the CPU load required for their operation.

Due to the increased processing requirement, the operation of a communication station using a CODEC that operates at the higher sampling rate is significantly more power-consumptive than operation of the communication station at the lower sampling rate. If the communication station is operated using the higher-sampling rate CODEC when the battery level is low, a call is more likely to be abruptly terminated due to lack of power than if the communication station is operated using the lower sampling-rate CODEC. And, in contrast, due to the lesser processing requirement when operating the lower sampling rate CODEC, a lengthier period of usability of the communication station is possible.

If a manner could be provided by which to take into account the battery level of a battery power supply that powers a communication station when selecting which CODEC to use, improved operability of the communication station would be possible.

It is in light of this information related to coding and decoding of data that the significant improvements of the present disclosure have evolved.

DETAILED DESCRIPTION

Figure 1:
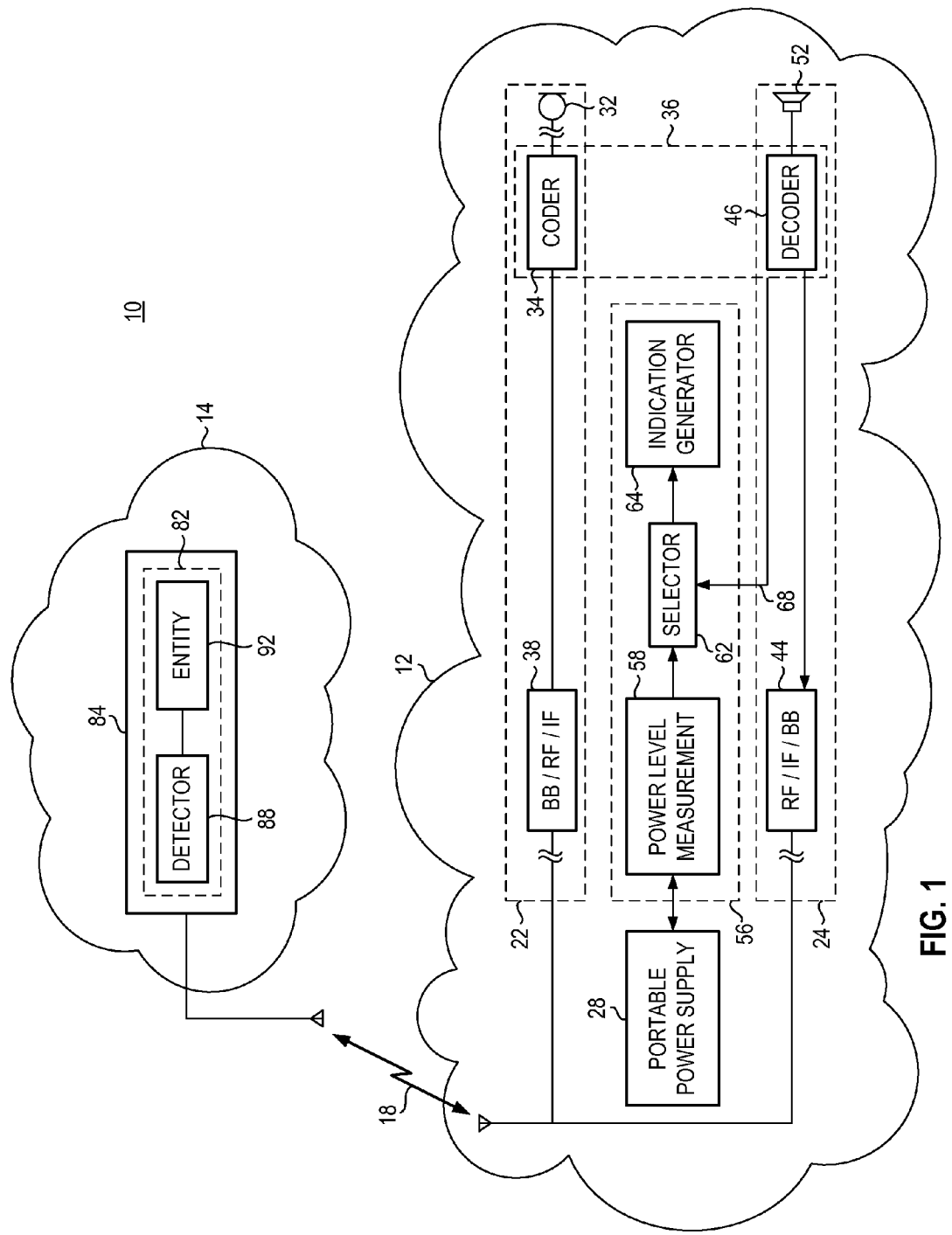
FIG. 1 illustrates a functional block diagram of a communication system in which an embodiment of the present disclosure is operable.

The present disclosure, accordingly, advantageously provides apparatus, and an associated method, for selecting which CODECs of a CODEC set to make available for use pursuant to a communication service. Selection is dependent upon the level of stored energy available at a battery power supply that powers the communication device. This method can be applied when there exists a subset of higher sampling rate CODECs within the implemented CODEC set which are optional according to the relevant communication standard.

Through operation of an embodiment of the present disclosure, a manner is provided by which to operate a communication device, such as a mobile station, that utilizes a CODEC of a set of CODECs.

In one aspect of the present disclosure, the availability of optional high-sampling-rate CODECs is selectably limited when the battery power supply is depleted beyond a selected level. By limiting the availability of the CODEC to only the lowest-sampling-rate CODECs, the rate at which the stored energy of the battery power supply is depleted is less than if a high-sampling rate CODEC were instead used. By reducing the rate of depletion of the stored energy, the talk-time, viz., the period of operability of the communication station, is lengthened.

In another aspect of the present disclosure, a measurement is made of the level of power stored at, or otherwise available at, the battery power supply that powers the communication device. An indication of the measured stored energy is formed, and the indication is used in the determination of which CODEC to make available for use.

In another aspect of the present disclosure, a first CODEC is operable at a first sampling rate, and at least a second CODEC is operable at least at a second sampling rate. In one implementation, the CODECs form, e.g., part of a mobile station operable in general conformity with a 3GPP ($3^{rd}$ Generation Partnership Project) in which an AMR speech CODEC and an AMR-WB speech CODEC are defined. The AMR CODEC comprises an 8 kHz sampling-rate speech CODEC, and the AMR-WB speech CODEC comprises a 16 kHz sampling-rate speech CODEC. The level of stored energy remaining at the portable power supply that powers the communication device is determinative of whether the AMR CODEC is available or whether both an AMR and an AMR-WB CODEC are available. In another implementation, a greater number of CODECs is potentially available.

In another aspect of the present disclosure, selection is made of which of the CODECs is to be made available. In the event that the stored energy level of the portable power supply is depleted beneath a certain threshold, a fixed threshold or a selected threshold, a selection is made to permit operation of only a lower sampling rate CODEC. And, if the stored energy level of the battery supply is greater than a threshold, a selected threshold or a fixed threshold, both of the lower and higher sampling-rate CODECs are made available.

In another aspect of the present disclosure, in the event that the stored energy level of the portable power supply is less than the threshold level, an indication is provided to a user of the communication device, and the user is provided with an opportunity to select whether to permit the higher sampling-rate CODEC to be made available or to limit the availability of operation to the lower sampling-rate CODEC. Alternately, a user selects, such as pursuant to communication-device configuration, selection of a default selection in the event that the battery level is determined to be beneath a threshold. The default selection of the user is determinative, in this scenario, of the allowable CODEC or CODECs in the event that the stored energy level of the battery power supply is determined to be less than the threshold. If the default selection is to permit the higher sampling rate CODEC to be made available, and corresponding better voice quality, the higher-sampling rate CODEC is selected to be made available in spite of the greater battery depletion rate associated with the higher operational rate. And, conversely, if default selection is made to limit availability of the CODEC to a lower sampling rate CODEC in the event that the stored battery depletion is beyond the threshold, then availability of the CODEC is limited to the lower sampling-rate CODEC.

In another aspect of the present disclosure, indication of the selection that is made is included in a message generated by the communication device to be sent to a remote location. The indication identifies which of the CODEC or CODECs are available to be operated. The indication, in a GERAN (Generic Radio Access Network) is contained in a bearer capability information element. In a UTRAN (Universal Terrestrial Radio Access Network), the indication forms one or more entries on a supported CODEC list. And, when the communication device forms a SIP (Session Initiation Protocol) device, the indication is used pursuant to a CODEC negotiation procedure.

In another aspect of the present disclosure, network apparatus is provided for detecting a message containing an available-CODEC indication of the CODECs availability at the portable communication device. The message indicates the CODEC to be only a lower sampling-rate CODEC in the event that the battery power supply has been depleted beneath a threshold. And, if a higher sampling-rate CODEC is allowable due to the battery power supply having an acceptable level of stored energy, or upon user selection, the message is indicative of the availability at the communication device to use a CODEC operable at the higher sampling rate.

In these and other aspects, therefore, an apparatus, and an associated method, is provided for facilitating CODEC selection for CODEC operation at a communication station powered by a portable power supply. A selector is configured to select, from amongst a set of CODECs available at the communication station. Each CODEC of the set has an associated sampling rate. Selection is made, at least in part, responsive to a level of stored energy at the portable power supply. An indication generator is configured to generate an indication of selection made by the selector.

Referring first, therefore, to FIG. 1, a radio communication system, shown generally at 10, provides for communication between sets of communication devices. In the exemplary implementation, the communication system 10, forms a radio communication system, such as a cellular communication system operable in general conformity with the operating protocols set forth in a $3^{rd}$ Generation Partnership Project (3GPP) operating specification. In other implementations, the communication system is operable in conformity with other operating standards and with other communication technologies.

Here, the communication system 10 includes mobile stations, of which the mobile station 12 is representative, that communicate with, or by way of, a communication network 14. Communications carried out between a mobile station and communication network are by way of a radio air interface 18, defined in conformity, here, with the 3GPP operating specification. The communication devices 12, here referred to, variously, as user equipment (UEs) and mobile stations, are typically of relatively small dimensions and weights, permitting their easy carriage by users thereof. UEs are regularly of dimensions permitting their hand-carriage and storage, such as in a shirt-pocket of the user. The UE forms a radio transceiver having a transmit part 22 and a receive part 24. The transmit and receive parts of the transceiver circuitry are powered by a portable power supply 28, i.e., a battery supply formed of one or more battery cells. The portable power supply powers the transceiver circuitry with energy stored at the power supply. During operation, the stored energy of the power supply is depleted, necessitating recharging for replacement of the power supply.

The transmit part 22 is here shown to include an acoustic transducer 32, a coder part 34 of a CODEC 36, and additional baseband, intermediate frequency, and radio frequency (BB/IF/RF) elements 38. And, the receive part of the UE includes radio frequency, intermediate frequency, and baseband frequency (RF/IF/BB) elements 44 and a decoder part 46 of the CODEC 36. A speaker 52, representative of an output transducer is also shown in the receive chain of the receive part.

The CODEC 36 is a selected CODEC, selected from a set of CODECs, each operated at a specific sampling rate. A single CODEC function element is shown in FIG. 1 as, in the exemplary implementation, the CODEC function is carried out by invoking operation of a CODEC algorithm. Alternately, multiple CODEC elements are positionable in parallel, with a selected CODEC element of the multiple CODEC elements caused to form part of the operable transmit and receive chains. In the exemplary implementation, the CODEC forms an AMR CODEC or an AMR-WB speech CODEC. As mentioned previously, the operation of a higher sampling-rate CODEC generally provides better voice quality of communications than a lower sampling-rate CODEC. But, operation of the higher rate CODEC requires more processing power and consumes more energy. Because the UE is powered by the battery power supply, the energy required to operate the CODEC is, in part, determinative of the rate of depletion of the stored energy thereat. When a communication service is initiated, if the stored energy of the power supply is marginal, i.e., already low, the operation of the higher sampling-rate CODEC might result in abrupt call failure due to depletion of stored energy to an extent that the mobile station can no longer be acceptably powered.

In accordance with an embodiment of the present disclosure, the UE further includes an apparatus 56 that operates to facilitate selection of the CODEC 36. The selection is made, at least in part, depending upon the level of stored energy at the portable power supply 28. The elements of the apparatus 56 are functionally represented, implementable in any desired manner, including, for instance, by algorithms executable by processing circuitry. Here, the apparatus is shown to include a battery power level measurer 58, a selector 62, and an indicator generator 64. The elements of the apparatus 56, while shown separately from the receive and transmit parts are, in one implementation, in part, or in entirety, at the transceiver circuitry of the mobile station.

During operation, the battery power level measurer 58 measures the stored power levels of the battery cells of the portable power supply. The measurements made by the measurer indicate the stored power capacity of the portable power supply, and indications of the measurements are provided to a selector 62. The selector is also configured to receive indications, here represented by way of the lines 68, of the CODECs that are available at the mobile station. The selector operates to select, which one, or more than one, of the CODECs is available. The selected one or more define the available CODEC or CODECs available at the mobile station. In the exemplary implementation, selection made by the selector, is responsive to the measured indication of the battery power level measured by the measurer 58, or otherwise provided to the selector. The selector selects, as an available operational rate of the CODEC, only a lower sampling rate when the measured battery power levels indicate a depleted battery power supply, depleted beneath a minimum threshold level. And, conversely, if the stored energy level of the battery power supply is indicated to be greater than a threshold, than the selector selects, as available operational rates, both a lower operational rate and a higher operational rate. And, the CODEC is permitted to be operated at any of the lower and higher operational rates. That is to say, in the exemplary implementation, the selector selects whether the available CODEC to be: 1.) an AMR CODEC, or 2.) either of the AMR or AMR-WB CODECs. In other implementations, CODECs of other capabilities are utilized. If, for instance, three CODECs are available, analogous selection is provided by the selector. Or, multiple combinations of sample-rate capabilities are made available, such as by use of multiple thresholds.

Selection made by the selector of the available CODECs is provided to the indication generator 64. The indication generator operates to form an indication representative of the selected availability. The indication is provided to a message-generative entity of the transmit part 22. For instance, when the mobile station is GERAN (Generic Radio Access Network)-compliant, the message-generative entity operates to form a bearer capability information element, and the indication forms part of the bearer capability information element. When the mobile station is UTRAN (Universal Terrestrial Radio Access Network)-compliant, the message-generative entity forms a supported CODEC list, and the indication generated by the generator 64 forms part of the list. And, for instance, when the UE is utilized pursuant to an SIP (Session Initiation Protocol) session, the indication is used pursuant to a CODEC negotiation procedure.

Further apparatus, indicated by the block 82 is embodied at the network part 14, here at a Base Transceiver Station (BTS) 84. The apparatus includes a detector 88 that detects delivery to the network of a message generated by the message-generative entity of the UE. And, the detected indication is provided to an operational entity 92 that utilizes the detected indication. The entity forms, for instance, a CODEC sampling-rate director that directs subsequent communications in conformity with the sampling rate indicated in the communicated message. The operational entity 92 is also representative of other elements of the network that analogously make use of the indication. And, in exemplary operation, the indication generated by the indication generator 64 is communicated to the network part 14 during a call set-up phase. Prior to establishment of a call, the CODEC that shall be used pursuant to the call is chosen.

Figure 2:
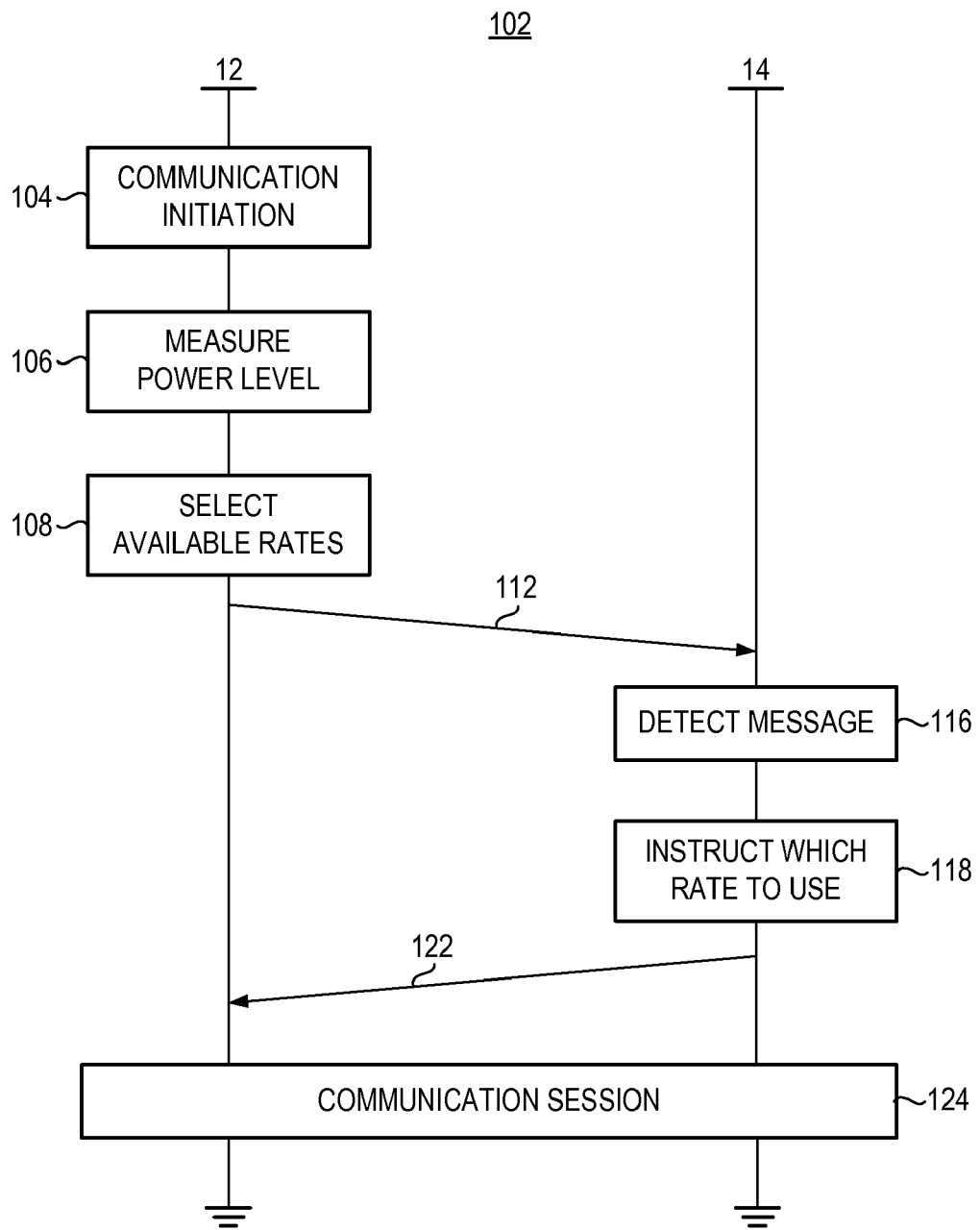
FIG. 2 illustrates a message sequence diagram representative of an embodiment of the present disclosure.

FIG. 2 illustrates a message sequence diagram, shown generally at 102, representative of operation of an embodiment of the present disclosure. First, and as indicated by the block 104, a communication service is initiated, either initiated at the UE 12 or in response to a service initiation request delivered to the UE. And, as indicated by the block 106, the power level of the battery, is measured. Then, and as indicated by the block 108, selection is made of the available CODEC or CODECs. As noted previously, in the exemplary implementation, the selection is dependent upon the stored energy level of the portable power supply. A message is generated and sent, indicated by the segment 112, to the network 114. The message is detected, indicated by the block 116, and, in response to the detected indication, instructions are generated, indicated by the block 118, of the selected CODEC to be used at the communication endpoints of the communication system. A signal is formed and sent, indicated by the segment 122, back to the mobile station that indicates the selected CODEC to be used during a communication session. And, as indicated by the block 124, a communication session commences using speech-coded data coded at the selected rate.

Figure 3:
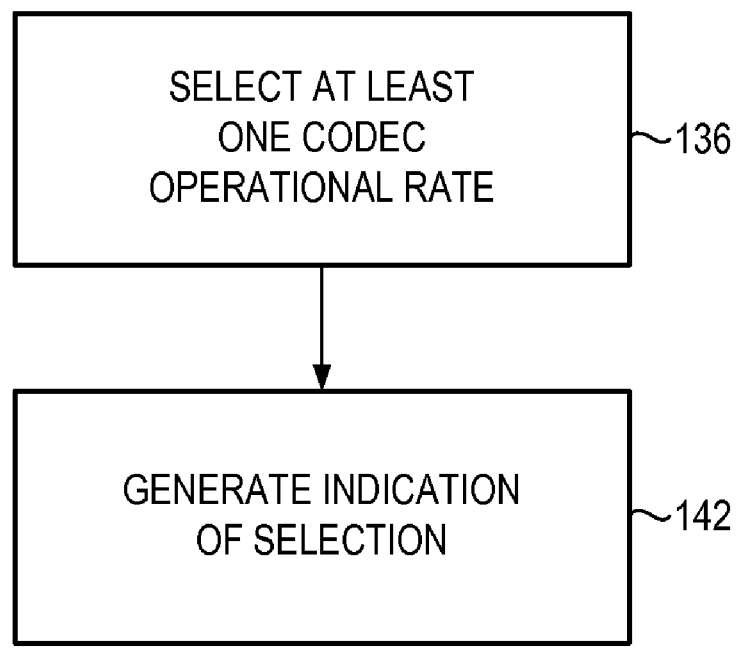
FIG. 3 illustrates a method flow diagram representative of the method of operation of an embodiment of the present disclosure.

FIG. 3 illustrates a method flow diagram, shown generally at 134, representative of the method of operation of an embodiment of the present disclosure. The method facilitates selection of a CODEC embodied at a communication station powered by a portable power supply.

First, and as indicated by the block 136, selection is made, from amongst CODECs of a CODEC set, of at least one CODEC. The selection is made, at least in part, responsive to a level of stored energy at the portable power supply. Then, and as indicated by the block 142, an indication of the selection is generated. Thereby, the CODEC is selected taking into account the stored energy at a battery power supply. In the event that the stored energy is less than a threshold, then the CODEC is permitted to be merely a lower sampling-rate CODEC. The rate of power consumption is accordingly reduced, thereby to permit lengthening of the time period in which the battery power supply can continue to power the communication device at which the CODEC forms a portion.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for facilitating CODEC selection for a CODEC operation at a communication station powered by a portable power supply and having a transmit part and a receive part to initiate and commence message communication with a communication network, said apparatus comprising:
   a selector configured to select, after an initiation of communication, from amongst a set of CODECs available at the communication station, each CODEC having an associated sampling rate, selection made, at least in part responsive to a level of stored energy at the portable power supply;
   an indication generator configured to generate an indication of selection made by said selector for transmission to the communication network; and
   a message-generative entity configured to receive instructions, generated by the communication network responsive to the indication of selection, for use of one CODEC of the selected set of CODECs available in commencing message communication.

2. The apparatus of claim 1 wherein said selector is further configured to receive CODEC sampling rate indicia associated with each CODEC of the set.

3. The apparatus of claim 1 wherein the set of CODECs comprises a CODEC that operates at a first sampling rate and a CODEC operable at a second sampling rate, the second sampling rate, the second sampling rate more power-consumptive than the first sampling rate.

4. The apparatus of claim 3 wherein said selector is configured to select one of: the CODEC operable at the first sampling rate, and both the CODEC operable at the first sampling rate and the CODEC operable at the second sampling rate.

5. The apparatus of claim 4 wherein said selector is configured to select the CODEC operable at the first sampling rate if the level of stored energy at the portable power supply is less than a first threshold.

6. The apparatus of claim 4 wherein said selector is configured to select both the CODEC operable at the first sampling rate and the CODEC operable at the second sampling rate if the level of stored energy at the portable power supply is greater than a first threshold.

7. The apparatus of claim 1 wherein said selector is further configured to make selection responsive to user preference if the level of stored energy at the portable power supply is less than a first threshold.

8. The apparatus of claim 1 wherein the indication generated by said indication generator forms part of a communication-station call setup information set.

9. The apparatus of claim 1 wherein the indication generated by said indication generator forms part of a bearer capability information element.

10. The apparatus of claim 1 wherein the indication generated by said indication generator defines a supported CODEC list.

11. The apparatus of claim 1 wherein the indication generated by said indication generator is used pursuant to a second-party CODEC rate negotiation.

12. The apparatus of claim 1 wherein said selector is configured to select at least one of a CODEC operable at 8 kHz sampling rate and a CODEC operable at a 16 kHz sampling rate.

13. The apparatus of claim 1 further comprising a power level measurer, responsive to the initiation of communication, that determines the level of stored energy at the portable power supply.

14. A method for facilitating a CODEC selection for CODEC operation at a communication station powered by a portable power supply and having a transmit part and a receive part to initiate and commence message communication with a communication network, said method comprising:
   selecting, after an initiation of communication, from amongst a set of CODECs available at the communication station, each CODEC having an associated sampling rate, selection made, at least in part, responsive to a level of stored energy at the portable power supply;
   generating an indication of the selection;
   transmitting the indication to the communication network; and
   receiving instructions, generated by the communication network responsive to the indication of selection, for using of one CODEC of the selected set of CODECs available to commence message communication.

15. The method of claim 14 wherein the set of CODECs comprises a CODEC that operates at a first sampling rate and a CODEC that operates at a first sampling rate and a CODEC operable at a second sampling rate, the second sampling rate more power consumptive than the first sampling rate.

16. The method of claim 15 wherein said selecting comprises selecting one of: the CODEC operable at the first sampling rate and both the CODEC operable at the first sampling rate and the CODEC operable at the second sampling rate.

17. The method of claim 16 wherein said selecting comprises selecting the CODEC operable at the first sampling rate if the level of stored energy at the portable power supply is less than a first threshold.

18. The method of claim 16 wherein said selecting comprises selecting both the CODEC operable at the first sampling rate and the CODEC operable at the second sampling rate if the level of stored energy of the portable power supply is greater than the first threshold.

19. The method of claim 14 wherein said selecting is further responsive to user preference if the level of stored energy is less than a first threshold.

20. The method of claim 14 further comprising measuring, responsive to the initiation of communication, the level of stored energy for the portable power supply.

21. The method of claim 14 wherein the generated indication of the selection further comprises a bearer capability information element.

22. An apparatus for facilitating communication-station to communication network message communication, said apparatus comprising:
   a detector configured to detect delivery of a message following initiation of a communication session that includes an indication of availability of a selected CODEC set available for operation at associated sampling rates pursuant to the communication-station communication session, the selected CODEC set selected, at least in part, based upon a portable-power-supply stored energy level; and a signal generator that indicates to a communication-station communication operational entity that the operational entity is to operate in accordance with a CODEC having a highest sampling rate of the CODECs in the selected set of CODECs for the communication session.

23. A method for facilitating communication-station to communication network message communication, said method comprising:

detecting delivery of a message following initiation of a communication session that includes an indication of availability of a selected CODEC set, available for operation at associated sampling rates pursuant to the communication-station communication, the selected CODEC operational rate selected, at least in part, based upon a portable-power-supply stored energy level; and generating a signal that indicates to a communication-station communication operational entity that the operational entity is to operate in accordance with a CODEC having a highest sampling rate of the CODECs in the selected set of CODECs for the communication session.

* * * * *